United States Patent
Jeon et al.

(10) Patent No.: US 8,592,098 B2
(45) Date of Patent: Nov. 26, 2013

(54) METAL SEPARATOR FOR FUEL CELL AND METHOD OF MANUFACTURING THE SAME

(75) Inventors: Yoo-Taek Jeon, Gyeonggi-do (KR);
Eun-Young Kim, Gyeonggi-do (KR);
Yeon-Soo Jeong, Gyeonggi-do (KR);
Ki-Jung Kim, Gyeonggi-do (KR);
Man-Been Moon, Gyeonggi-do (KR)

(73) Assignee: Hyundai Hysco, Ulsan (KR)

( * ) Notice: Subject to any disclaimer, the term of this patent is extended or adjusted under 35 U.S.C. 154(b) by 251 days.

(21) Appl. No.: 13/052,949

(22) Filed: Mar. 21, 2011

(65) Prior Publication Data

US 2011/0229800 A1 Sep. 22, 2011

(30) Foreign Application Priority Data

Mar. 22, 2010 (KR) ........................ 10-2010-0025430

(51) Int. Cl.
*H01M 8/02* (2006.01)
*B05D 5/12* (2006.01)
*B32B 15/00* (2006.01)

(52) U.S. Cl.
USPC ........... 429/520; 429/521; 429/522; 427/115; 427/122; 427/405; 428/634

(58) Field of Classification Search
USPC .......... 429/519, 520, 521, 522; 427/115, 122, 427/405; 428/634; 204/298.36
See application file for complete search history.

(56) References Cited

U.S. PATENT DOCUMENTS

| | | | | |
|---|---|---|---|---|
| 4,013,487 | A * | 3/1977 | Ramqvist et al. | 427/405 X |
| 5,695,832 | A * | 12/1997 | Hirano et al. | 427/122 X |
| 7,052,794 | B2 * | 5/2006 | Nakata et al. | 427/115 X |
| 7,264,741 | B2 * | 9/2007 | Hartig | 204/298.36 X |
| 7,550,174 | B2 * | 6/2009 | Vyas et al. | 427/115 |
| 2003/0228510 | A1 | 12/2003 | Nakata et al. | |
| 2004/0005502 | A1 * | 1/2004 | Schlag | 427/122 X |
| 2004/0170881 | A1 * | 9/2004 | Nakata | 427/115 X |
| 2008/0160390 | A1 | 7/2008 | Nakata | |

FOREIGN PATENT DOCUMENTS

| JP | 2009238691 | 10/2009 |
|---|---|---|
| JP | 2009289707 | 12/2009 |
| WO | WO2008/140148 A | 11/2008 |
| WO | WO2009041135 | 4/2009 |

* cited by examiner

*Primary Examiner* — Stephen J. Kalafut
(74) *Attorney, Agent, or Firm* — Foley & Lardner LLP

(57) ABSTRACT

Disclosed are a metal separator for fuel cells, which exhibits excellent properties in terms of corrosion resistance, electrical conductivity and durability, and a method of manufacturing the same. The metal separator for fuel cells includes a separator-shaped metal matrix and a coating layer formed on the metal matrix. The coating layer has a concentration gradient of a carbon element C and a metal element Me according to a thickness thereof such that the carbon element C becomes gradually concentrated in the coating layer with increasing distance from the metal matrix, and the metal element Me becomes gradually concentrated in the coating layer with decreasing distance from the metal matrix.

11 Claims, 3 Drawing Sheets

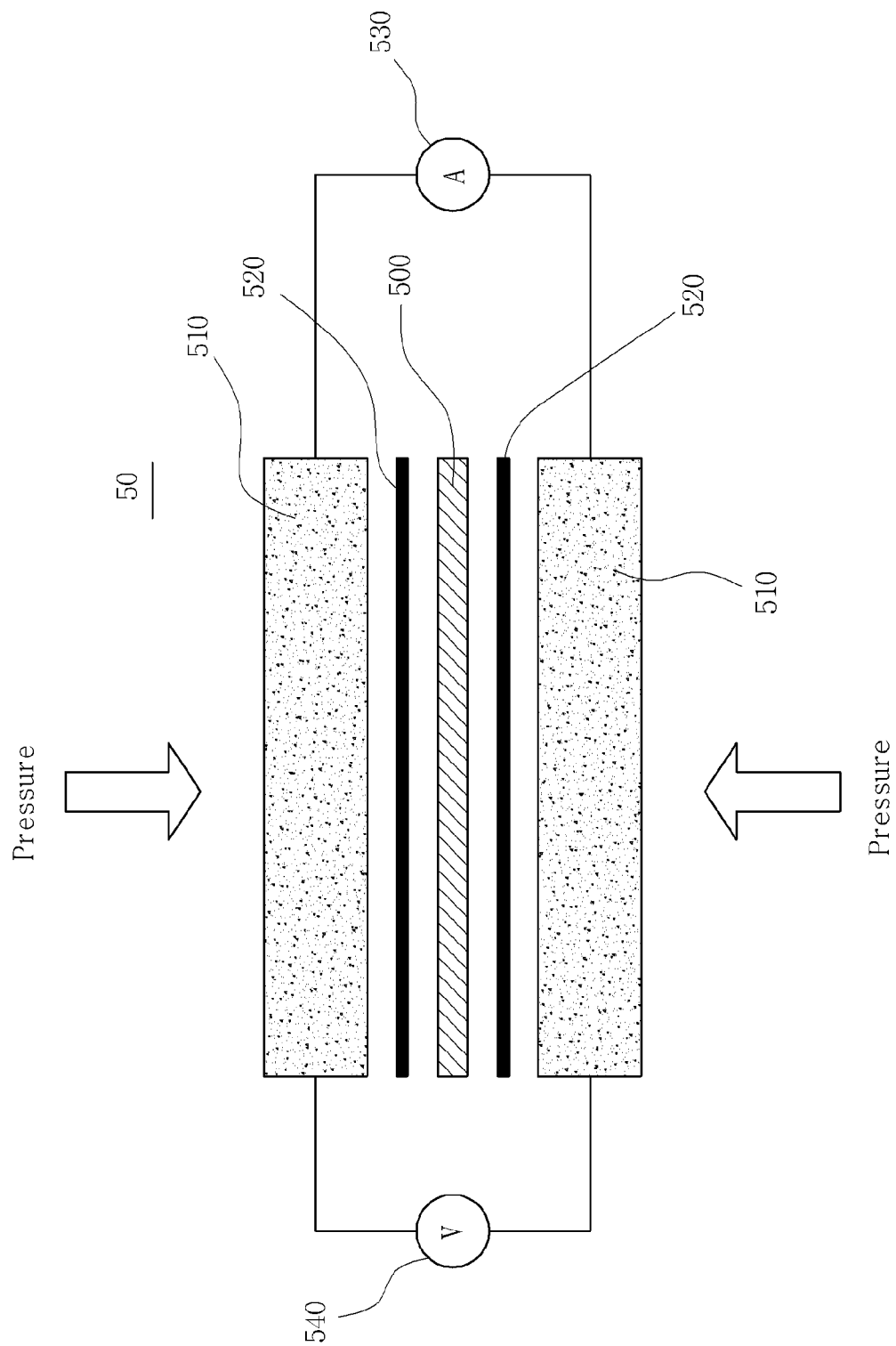

METAL SEPARATOR FOR FUEL CELL AND METHOD OF MANUFACTURING THE SAME

CROSS-REFERENCE TO RELATED APPLICATIONS

This applications claims priority to South Korea Priority Application 10-2010-0025430, filed Mar. 22, 2010 including the specification, drawings, claims and abstract, is incorporated herein by reference in its entirety.

BACKGROUND

1. Technical Field

Embodiments of the invention relate to a metal separator for fuel cells and, more particularly, to a metal separator for fuel cells and a method of manufacturing the same, in which a metal element and a carbon element are coated on a separator-shaped metal matrix such that a gradient is formed whereby the carbon element is concentrated on the surface of the metal matrix, or in which a buffer layer is formed using metal on the separator-shaped metal matrix and an amorphous carbon layer is coated on the buffer layer, thereby enhancing properties of the metal separator such as corrosion resistance, electrical conductivity, durability, and the like.

2. Description of the Related Art

A fuel cell is an electrochemical cell that converts chemical energy produced by oxidation of fuel into electrical energy. Recently, various investigations have focused on development of fuel cells, solar cells, and the like in order to overcome problems such as consumption of fossil fuels, the greenhouse effect and global warming caused by carbon dioxide, and the like.

Fuel cells generally convert chemical energy into electrical energy through oxidation and reduction of hydrogen and oxygen. In the fuel cell, hydrogen is oxidized into hydrogen ions and electrons at an anode, and the hydrogen ions diffuse to a cathode through an electrolyte. The electrons travel to the cathode through a circuit. At the cathode, water is produced through reduction of the hydrogen ions, electrons, and oxygen.

In general, since a unit cell of a fuel cell generates too low a voltage to be used alone in practice, the fuel cell has several to several hundred unit cells stacked therein. When stacking the unit cells, a bipolar plate or separator is used to facilitate electrical connection between unit cells and to separate reaction gases.

The separator for fuel cells may be classified into a graphite separator, a metal separator, and the like according to the material of which the separator is made.

The graphite separator has been widely employed for a conventional separator for fuel cells. The graphite separator is manufactured by milling graphite according to the shape of a flow passage. In this case, the graphite separators in the stack represent 50% of the total manufacturing costs and 80% of the total weight of the stack. Accordingly, the graphite separator has problems of high manufacturing costs and large volume.

To solve such problems of the graphite separator, metal separators have been developed. Metal separators have many advantages, such as easy processibility, overall reduction in volume and weight of a fuel cell stack through thickness reduction of the separator, mass productivity, and the like.

In this case, however, the metallic material of the separator inevitably undergoes corrosion during use of the fuel cell, causing contamination of a membrane electrode assembly and performance deterioration of the fuel cell stack, and a thick oxide film can grow on the surface of the metal separator after extended use of the fuel cell, causing an increase in internal resistance of the fuel cell.

Therefore, there is a need for a metal separator for fuel cells, which has high corrosion resistance and electrical conductivity to improve performance of the metal separator by suppressing corrosion of the metal and the increase in internal resistance of the fuel cell.

BRIEF SUMMARY

One aspect of the present invention is to provide a metal separator for fuel cells, which may guarantee high corrosion resistance and electrical conductivity even with a thin coating layer through an amorphous carbon coating or a metal doped carbon coating.

Another aspect of the present invention is to provide a method of manufacturing a metal separator for fuel cells, in which a metal element and a carbon element are coated on a separator by adjusting the coating thickness or by sequentially coating the metal element and the carbon element such that the carbon element is coated on the outermost layer of the separator, thereby guaranteeing high corrosion resistance and electrical conductivity.

In accordance with one embodiment of the invention, a metal separator for fuel cells includes: a separator-shaped metal matrix and a coating layer formed on the metal matrix. Here, the coating layer has a concentration gradient of a carbon element C and a metal element Me according to a thickness thereof such that the concentration of the carbon element C gradually increases in the coating layer with increasing distance from the metal matrix and the concentration of the metal element Me gradually increases in the coating layer with decreasing distance from the metal matrix.

In accordance with another embodiment of the invention, a metal separator for fuel cells includes a separator-shaped metal matrix and a coating layer formed on the metal matrix. Here, the coating layer includes a metal layer composed of a metal element Me on the metal matrix and a carbon layer composed of a carbon element C on the metal layer.

BRIEF DESCRIPTION OF THE DRAWINGS

The above and other aspects, features and advantages of the present invention will become apparent from the detailed description of the following embodiments in conjunction with the accompanying drawings:

FIG. 5 is a sectional view of a contact resistance tester for measuring contact resistance of a metal separator according to one embodiment of the present invention.

DETAILED DESCRIPTION

Exemplary embodiments of the invention will now be described in detail with reference to the accompanying drawings.

It should be understood that the present invention is not limited to the following embodiments and may be embodied in different ways, and that the embodiments are given to provide complete disclosure of the invention and to provide thorough understanding of the invention to those skilled in the art. The scope of the invention is limited only by the accompanying claims and equivalents thereof. Herein, descriptions of details apparent to those skilled in the art will be omitted for clarity.

Figure 1:
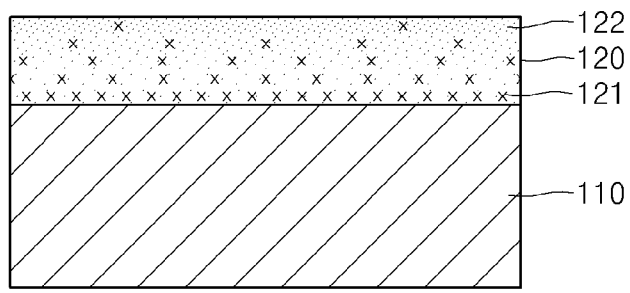
FIG. 1 is a schematic sectional view of a metal separator for fuel cells according to one embodiment of the present invention.

FIG. 1 is a schematic sectional view of a metal separator for fuel cells according to one embodiment of the present invention.

Referring to FIG. 1, the metal separator according to this embodiment includes a separator-shaped metal matrix 110 and a coating layer 120.

For the metal matrix 110, any material may be used so long as the material can be used for a typical metal separator for fuel cells. For example, the metal matrix 110 may comprise stainless steel, aluminum, titanium, nickel, or alloys thereof. Particularly, stainless steel, which is lightweight and exhibits excellent corrosion resistance, may be advantageously used for the metal matrix. In this embodiment, the metal matrix may be formed to have a separator shape.

On the other hand, since these materials for the metal matrix 110 do not demonstrate satisfactory corrosion resistance and electrical conductivity under high temperature and high moisture conditions, the coating layer 120 is formed on the surface of the metal matrix 110 to provide satisfactory corrosion resistance and electrical conductivity.

Here, the coating layer 120 is composed of a metal element (Me) 121 and a carbon element (C) 122.

The metal element (Me) 121 may be at least one selected from zirconium (Zr), copper (Cu), gold (Au), silver (Ag), molybdenum (Mo), tungsten (W), chromium (Cr), titanium (Ti), scandium (Sc), vanadium (V), manganese (Mn), iron (Fe), cobalt (Co), nickel (Ni), aluminum (Al), and the like, which exhibit excellent electrical conductivity.

The carbon element (C) 122 may be amorphous carbon such as diamond like carbon (DLC), which exhibits excellent corrosion resistance, durability and electrical conductivity. Carbon may be diamond carbon, amorphous carbon, graphite carbon, and the like. The diamond carbon has very low electrical conductivity and the graphite carbon has negative film density. Accordingly, in this embodiment, the amorphous carbon having intermediate properties between diamond and graphite is used as the carbon element 122 in consideration of durability and conductivity of the metal separator. Obviously, insufficient electrical conductivity of the amorphous carbon may be compensated for using metal or the like.

The metal element 121 serves to enhance adhesion of the coating layer to the metal matrix 110 while relieving stress applied to the metal matrix 110 and compensating for electrical conductivity. The carbon element 122 serves to enhance corrosion resistance of the separator. In this viewpoint, it is desirable that the metal element 121 be concentrated near the metal matrix 110 and the carbon element 122 be concentrated near the surface of the separator.

Accordingly, in the embodiment shown of FIG. 1, the coating layer is formed to have a concentration gradient of the carbon element C and the metal element Me. In more detail, the concentration of the carbon element C gradually increases with increasing distance from the metal matrix 110 in the coating, thereby forming a C-enriched or C-rich region, and the concentration of the metal element Me gradually increases with decreasing distance from the metal matrix 110 in the coating, thereby forming a Me-enriched or Me-rich region. At this time, the concentration gradient of the carbon element C and the metal element Me according to the thickness of the coating layer is not necessarily linear, so long as the carbon element C and the metal element Me are distributed to have such a concentration gradient in the thickness direction of the coating layer 120, that is, the gradient wherein the carbon element C is concentrated near the surface of the coating layer 120 and the metal element Me is concentrated near the metal matrix 110.

Here, the C-enriched region, that is, the region in the coating layer 120 where the content of the carbon element 122 is greater than that of the metal element 121, may have a thickness of 0.01~5.0 μm. If the thickness of the C-enriched region is less than 0.01 μm, it is difficult to obtain enhancement of corrosion resistance of the separator. If the thickness of the C-enriched region exceeds 5.0 μm, the manufacturing costs of the metal separator can increase.

Further, the Me-enriched region, that is, the region in the coating layer 120 where the content of the metal element 121 is greater than that of the carbon element 122, may have a thickness of 0.01~5.0 μm. If the thickness of the Me-enriched region is less than 0.01 μm, adhesion of the carbon element 122 concentrated on the surface of the coating layer can be deteriorated. If the thickness of the Me-enriched region exceeds 5.0 μm, adhesion can be deteriorated and the manufacturing costs of the metal separator can increase due to low productivity.

Figure 2:
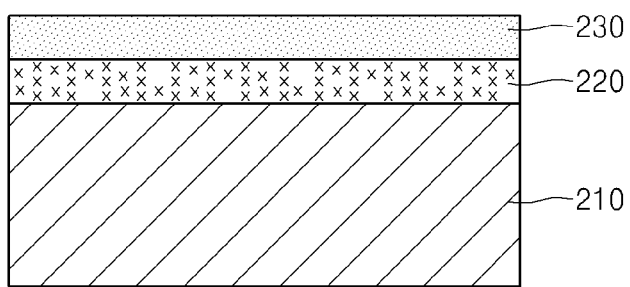
FIG. 2 is a schematic sectional view of a metal separator for fuel cells according to another embodiment of the present invention.

FIG. 2 is a schematic sectional view of a metal separator for fuel cells according to another embodiment of the present invention.

Referring to FIG. 2, the metal separator according to this embodiment includes a separator-shaped metal matrix 210, a metal layer 220, and a carbon layer 230.

In the embodiment shown in FIG. 1, the metal separator include a single coating layer composed of the metal element Me and the carbon element C in a certain concentration gradient. In this embodiment shown in FIG. 2, however, substantially distinctive two coating layers are formed on the separator-shaped metal matrix 210.

The two coating layers formed on the metal matrix 210 include a metal layer 220 and a carbon layer 230.

The metal layer 220 is first formed on the metal matrix 210 to enhance adhesion of the carbon layer 230 while distributing stress on the metal matrix 210 during formation of the carbon layer 230. The metal layer 220 may be formed of, for example, zirconium (Zr), copper (Cu), gold (Au), silver (Ag), molybdenum (Mo), tungsten (W), chromium (Cr), titanium (Ti), scandium (Sc), vanadium (V), manganese (Mn), iron (Fe), cobalt (Co), nickel (Ni), and aluminum (Al), which exhibit excellent electrical conductivity.

The carbon layer 230 composed of carbon is deposited on the metal layer 220 to enhance corrosion resistance, electrical conductivity, and the like of the separator. Here, the carbon layer 230 may be an amorphous carbon layer or a metal-doped carbon layer. If the carbon layer 230 is a metal-doped carbon layer, the metal doped in the carbon layer may be at least one selected from, for example, zirconium (Zr), copper (Cu), gold (Au), silver (Ag), molybdenum (Mo), tungsten (W), chromium (Cr), titanium (Ti), scandium (Sc), vanadium (V), manganese (Mn), iron (Fe), cobalt (Co), nickel (Ni), and aluminum (Al), as in the metal layer 220.

The metal layer 220 may have a thickness of 0.01~5.0 μm and the carbon layer 230 may have a thickness of 0.01~5.0 μm. As described above, if the thickness of the metal layer 220 is less than 0.01 μm, adhesion of the carbon layer 230 can be deteriorated, and if the thickness of the carbon layer 230 is less than 0.01 μm, enhancement in corrosion resistance, electrical conductivity, and durability of the separator can be insufficient. Further, if the thicknesses of the metal layer 220 and the carbon layer 230 are not within these ranges, the separator does not have further enhanced effect and thus requires increased amounts of carbon and metal elements to compensate for the insufficient effect, thereby increasing manufacturing costs of the separator.

Figure 3:
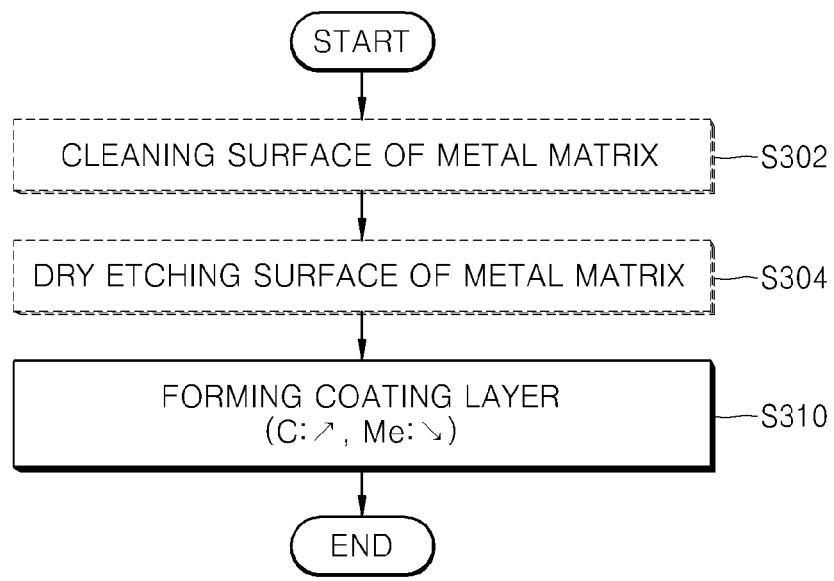
FIG. 3 is a flowchart of a method of manufacturing a metal separator for fuel cells according to one embodiment of the present invention.

FIG. 3 is a flowchart of a method of manufacturing a metal separator for fuel cells according to one embodiment of the invention, through which the metal separator for fuel cells as shown in FIG. 1 is manufactured.

Referring to FIG. 3, the method of manufacturing the metal separator according to this embodiment includes cleaning a surface of a metal matrix in S302, dry etching the surface of the metal matrix in S304, and forming a coating layer in S310.

In operation S302 of cleaning the surface of the metal matrix, organic or inorganic materials are cleaned from the surface of the metal matrix for 5 to 10 minutes by at least one of chemical cleaning, commercial degreasing, and dry etching using, for example, acetone, ethanol, or any commercial degreasing agent.

In operation S304 of dry etching, an oxide layer or impurities are removed from the surface of the metal matrix before forming the coating layer in S310. Dry etching is performed to activate the surface of the metal matrix by ion-gun etching or sputtering etching using argon gas or the like.

For the dry etching operation, ion-gun etching may be performed using an ion gun by supplying argon at a flow rate of about 40~60 sccm into a reactor and applying a voltage of 800~1500V and a current of 0.15~0.25 A to the ion gun.

Here, if the voltage applied to the ion gun is less than 800V with a current of 0.2 A applied thereto, effects of ion-gun etching can be deteriorated. Thus, the voltage applied to the ion gun is preferably greater than or equal to 800V. Ion-gun etching may be performed for about 10~30 minutes, but this duration can be changed according to the thickness of the oxide layer on the metal matrix, the etching rate, and the like.

Ion-gun etching removes chemical layers at a higher rate than grinding, can eliminate an unnecessary process causing an increase in temperature of the matrix surface and oxidation atmosphere during the process, and can minimize difference of illumination, which can deteriorate adhesion during coating.

Although the operation of cleaning the surface of the metal matrix in S302 and the operation of dry etching in S304 are not necessary, these operations are preferably performed to enhance adhesion of the coating layer formed on the metal matrix.

In operation S310 of forming the coating layer, a metal element and a carbon element are coated on the metal matrix to form the coating layer on the metal matrix. The coating layer may be formed by various processes, such as physical vapor deposition (PVD), chemical vapor deposition (CVD), and atomic layer deposition. For example, in the PVD process, the carbon element and the metal element may be deposited on the metal matrix using a carbon element target, a metal element target, and argon gas.

At this time, in operation S310 of forming the coating layer, the coating layer is formed on the separator-shaped metal matrix to have a concentration gradient of the carbon element C and the metal element Me according to the thickness of the coating layer. In more detail, the coating layer is formed on the metal matrix such that the carbon element C becomes gradually concentrated with increasing distance from the metal matrix in the coating layer to form a C-enriched or C-rich region, and the metal element Me becomes gradually concentrated with decreasing distance from the metal matrix in the coating layer to form a Me-enriched or Me-rich region. For this purpose, as shown in FIG. 3, the coating amount of the carbon element C is gradually increased and the coating amount of the metal element Me is gradually decreased, as the coating proceeds. Specifically, the metal element is mainly used at an initial coating stage and is then gradually reduced in coating amount. Accordingly, the carbon element is gradually increased in amount and is then mainly used at a final coating stage.

As described above, the C-enriched region formed at a first half stage in the coating layer and having a higher concentration of the carbon element than the metal element may have a thickness of 0.01~5.0 μm, and the Me-enriched region formed at a second half stage in the coating layer and having a higher concentration of the metal element than the carbon element may have a thickness of 0.01~5.0 μm.

Figure 4:
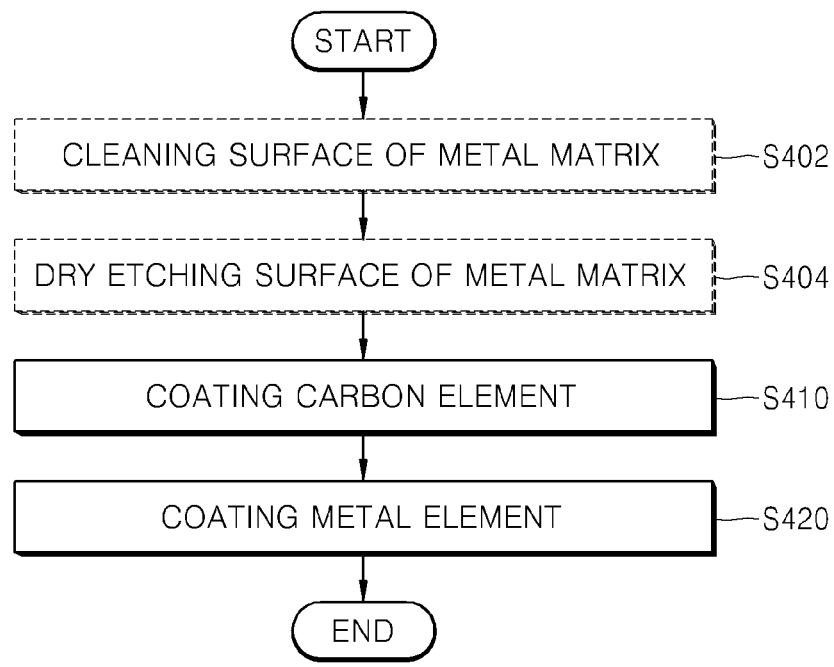
FIG. 4 is a flowchart of a method of manufacturing a metal separator for fuel cells according to another embodiment of the present invention.

FIG. 4 is a flowchart of a method of manufacturing a metal separator for fuel cells according to another embodiment of the invention, in which the metal separator for fuel cells as shown in FIG. 2 is manufactured.

Referring to FIG. 4, the method of manufacturing the metal separator according to this embodiment include cleaning a surface of a metal matrix in S402, dry etching the surface of the metal matrix in S404, forming a metal layer in S410, and forming a carbon layer in S420.

In this embodiment, the operation of cleaning the surface of the metal matrix in S402 and the operation of dry etching the surface of the metal matrix in S404 are the same as those of the embodiment shown in FIG. 3, and thus detailed descriptions thereof will be omitted herein.

Although the operation of cleaning the surface of the metal matrix in S402 and the operation of dry etching in S404 are not necessary, these operations are preferably performed to enhance adhesion of the coating layer formed on the metal matrix In the embodiment shown in FIG. 3, a single coating layer is formed using the metal element and the carbon element. In the embodiment shown in FIG. 4, however, the metal layer and the carbon layer are formed as separate coating layers.

In operation S410 of forming the metal layer, a metal element Me is coated on the metal matrix to form the metal layer as a buffer layer. The metal layer formed in this operation S410 serves to enhance adhesion of the coating layer while relieving stress applied to the metal matrix during formation of the carbon layer.

In operation S420 of forming the carbon layer, the carbon layer is formed on the metal layer. Here, the carbon layer may be an amorphous carbon layer or a metal-doped carbon layer.

The metal element used in operation S420 of forming the metal layer or used for metal doping in operation S420 of forming the carbon layer may be one selected from, for example, zirconium (Zr), copper (Cu), gold (Au), silver (Ag), molybdenum (Mo), tungsten (W), chromium (Cr), titanium (Ti), scandium (Sc), vanadium (V), manganese (Mn), iron (Fe), cobalt (Co), nickel (Ni), and aluminum (Al), which exhibit excellent electrical conductivity. These metal elements may be used alone or in a combination thereof.

According to the embodiments, the metal separator for fuel cells has an amorphous carbon layer and the like formed therein, thereby improving corrosion resistance, electrical conductivity, and durability.

According to the embodiments, the metal separator for fuel cells permits a highly dense amorphous carbon layer to be formed at low process cost, thereby enabling overall reduction in the thickness and manufacturing costs of the metal separator.

According to the embodiments, in the method of manufacturing the metal separator for fuel cells, foreign matter is removed from the surface of the metal matrix through chemical cleaning, commercial degreasing, dry etching or the like, so that adhesion between the metal matrix and the coating layer is enhanced during formation of the coating layer without undesirable exposure to an oxidizing atmosphere.

EXAMPLE

Next, the present invention will be described with reference to some examples. It should be understood that these examples are given by way illustration only and should not be interpreted as restricting the scope of the invention in any sense.

Descriptions of details apparent to those skilled in the art will be omitted herein for clarity.

1. Manufacture of Metal Separator for Fuel Cell

Stainless steel (316L, thickness: 0.1 mm) was used as a separator-shaped metal matrix and metal separators for fuel cells according to Examples 1 to 10 and Comparative Examples 1 to 10 were prepared according to conditions listed in Table 1.

Measurement of contact resistance was performed by application of DC 5 A and AC 0.5 A to a measurement target in a constant current mode at a frequency in the range of 10 kHz to 10 mHz. The carbon paper was 10BB available from SGL Inc.

In the contact resistance tester 50, a sample 500 was disposed between two pieces of carbon paper 520 and copper plates 510 connected to both a current supplier 530 and a voltage tester 540.

After positioning the sample 500, voltage was measured by applying DC 5 A/AC 0.5 A to the sample 500 using a current supplier 530 (available from Zahner Inc., Model IM6).

Then, the sample 500, carbon paper 520, and copper plates 510 were compressed to form a stacked structure from both copper plates 510 of the contact resistance tester 50 using a pressure regulator (Model No. 5566, available from Instron Inc., compression maintaining test). Using the pressure regulator, a pressure of 50~150 N/cm$^2$ was applied to the contact resistance tester 50.

TABLE 1

| Sample No. | Cleaning | Dry etching | Metal layer (μm) | Carbon layer (μm) | Adhesion (N) | Corrosion rate (μA/cm$^2$) | Contact resistance (mΩ·cm$^2$) |
|---|---|---|---|---|---|---|---|
| Example 1 | ○ | ○ | 0.02 | 0.02 | 30 | 6.2 | 18.6 |
| Example 2 | ○ | ○ | 0.02 | 0.1 | 30 | 3.3 | 16.4 |
| Example 3 | ○ | ○ | 0.05 | 2 | 30 | 1.2 | 15.2 |
| Example 4 | ○ | ○ | 0.11 | 4 | 30 | 0.8 | 16.7 |
| Example 5 | ○ | ○ | 0.21 | 4.7 | 30 | 0.6 | 17.3 |
| Example 6 | ○ | ○ | 0.5 | 3 | 30 | 0.7 | 14 |
| Example 7 | ○ | ○ | 2.3 | 0.5 | 30 | 1.7 | 15.3 |
| Example 8 | ○ | ○ | 3.1 | 0.2 | 30 | 2.3 | 21.3 |
| Example 9 | ○ | ○ | 4.8 | 0.01 | 30 | 4.3 | 19.6 |
| Example 10 | ○ | ○ | 4.9 | 0.01 | 30 | 4.1 | 22 |
| Comparative Example 1 | X | X | X | 0.6 | X (delamination) | Non-measurable | Non-measurable |
| Comparative Example 2 | X | X | 0.6 | X | X (delamination) | Non-measurable | Non-measurable |
| Comparative Example 3 | ○ | ○ | 0.6 | 0.008 | 15 | 10 | 40 |
| Comparative Example 4 | ○ | ○ | 0.6 | 6.3 | X (delamination) | Non-measurable | Non-measurable |
| Comparative Example 5 | ○ | ○ | 0.007 | 0.3 | 10 | 16 | 28 |
| Comparative Example 6 | ○ | ○ | 0.5 | 0.007 | 12 | 12 | 24 |
| Comparative Example 7 | ○ | ○ | 5.9 | 0.009 | 16 | 30 | 35 |
| Comparative Example 8 | ○ | ○ | 5.9 | 0.009 | 14 | 27 | 33 |
| Comparative Example 9 | ○ | ○ | 5.9 | 6.3 | X (delamination) | Non-measurable | Non-measurable |
| Comparative Example 10 | ○ | ○ | 5.9 | 8.7 | X (delamination) | Non-measurable | Non-measurable |

※ Evaluation of adhesion performed up to 30N

2. Property Evaluation (1) Measurement of Contact Resistance

FIG. 5 is a sectional view of a contact resistance tester for measuring contact resistance of a stainless steel separator according to one embodiment of the invention.

Referring to FIG. 5, in order to obtain optimized parameters for cell assembly through measurement of contact resistance of a metal separator 500 for fuel cells, a modified Davies method was used to measure contact resistance between the metal separator and two pieces of carbon paper.

The contact resistance was measured based on the principle of measuring four-wire current-voltage via a contact resistance tester available from Zahner Inc., Model IM6D.

Finally, the contact resistances of samples 500 of Examples 1 to 10 and Comparative Examples 1 to 10 were measured using the contact resistance tester 50 installed as described above.

(2) Measurement of Corrosion Current Density

A corrosion current density of each of the metal separators of Examples 1 to 10 and Comparative Examples 1 to 10 was measured using EG&G Model No. 273A as a corrosion current tester. Tests for corrosion durability were performed in a simulated environment of a polymer electrolyte fuel cell (PEFC).

After being etched at 80 with 0.1N $H_2SO_4$+5 ppm HF as an etching solution, the metal separator sample was subjected to N₂ bubbling for 1 hour and the corrosion current density thereof was measured at an open circuit potential (OCP) of −0.25V~1.2 V vs. SCE.

Other physical properties were measured at −0.24V vs. SCE for a PEFC anode environment and at 0.6V vs. SCE for a PEFC cathode (saturated calomel electrode, SCE) environment.

Here, the measured properties were evaluated based on corrosion current data measured at 0.6V vs. SCE in a simulated cathode environment of a fuel cell.

The anode environment is an environment in which hydrogen is split into hydrogen ions and electrons while passing through a membrane electrode assembly (MEA), and the cathode environment is an environment in which oxygen combines with the hydrogen ions to produce water after passing through the MEA.

Since the cathode environment has a high potential and is a very corrosive environment, corrosion resistance is preferably tested in the cathode environment.

3. Evaluation Result

Referring to Table 1, it can be seen that Examples 1 to 10 have a corrosion current density in the range of 0.6~6.2 μA/cm² and a contact resistance in the range of 14~22 mΩ·cm².

On the other hand, Comparative Examples 1 to 10 have a corrosion current density in the range of 10~30 μA/cm² and a contact resistance in the range of 24~40 mΩ·cm².

This result means that the examples subjected to cleaning and dry etching and including all of the metal layer and the coating layer exhibit excellent electrical conductivity, corrosion resistance, and durability.

On the other hand, if one of the carbon layer and the metal layer was not formed or had a thickness of less than 0.01 μm or greater than 5.0 μm, corrosion current density and contact resistance couldn't be measured due to delamination of a thin film due to residual stress.

Although some embodiments have been described herein, it should be understood that these embodiments are given by way of illustration only and do not limit the scope of the invention, and that various modifications, changes and additions can be made by a person having ordinary knowledge in the art without departing from the scope and spirit of the invention and should be construed as being included in the scope of the claims and equivalents thereof.

What is claimed is:

1. A metal separator for fuel cells comprising:
a separator-shaped metal matrix and
a coating layer formed on the metal matrix,
the coating layer having a concentration gradient of a carbon element C and a metal element Me according to a thickness thereof such that the carbon element C becomes gradually concentrated in the coating layer with increasing distance from the metal matrix and the metal element Me becomes gradually concentrated in the coating layer with decreasing distance from the metal matrix
wherein a region having a higher concentration of the carbon element than that of the metal element in the coating layer has a thickness of 0.01~5.0 μm, and a region having a higher concentration of the metal element than that of the carbon element in the coating layer has a thickness of 0.01~5.0 μm.

2. The metal separator according to claim 1, wherein the metal element Me is at least one selected from zirconium (Zr), copper (Cu), gold (Au), silver (Ag), molybdenum (Mo), tungsten (W), chromium (Cr), titanium (Ti), scandium (Sc), vanadium (V), manganese (Mn), iron (Fe), cobalt (Co), nickel (Ni), and aluminum (Al).

3. The metal separator according to claim 1, wherein the metal matrix comprises at least one selected from stainless steel, aluminum, titanium, nickel, and alloys thereof.

4. A metal separator for fuel cells comprising:
a separator-shaped metal matrix and
a coating layer formed on the metal matrix,
the coating layer comprising a metal layer composed of a metal element Me and formed on the metal matrix, and a carbon layer composed of a carbon element C and formed on the metal layer,
wherein the carbon layer has a thickness of 0.01~5.0 μm and the metal layer has a thickness of 0.01~5.0 μm.

5. The metal separator according to claim 4, wherein the carbon layer is an amorphous carbon layer or a metal-doped carbon layer.

6. The metal separator according to claim 5, wherein the metal of the metal-doped carbon layer is at least one selected from zirconium (Zr), copper (Cu), gold (Au), silver (Ag), molybdenum (Mo), tungsten (W), chromium (Cr), titanium (Ti), scandium (Sc), vanadium (V), manganese (Mn), iron (Fe), cobalt (Co), nickel (Ni), and aluminum (Al).

7. A method of manufacturing a metal separator for fuel cells, comprising:
forming a coating layer on a separator-shaped metal matrix to have a concentration gradient of a carbon element C and a metal element Me according to a thickness thereof by gradually increasing a coating amount of the carbon element C and gradually decreasing a coating amount of the metal element, as coating proceeds,
such that the carbon element C becomes gradually concentrated in the coating layer with increasing distance from the metal matrix, and the metal element Me becomes gradually concentrated in the coating layer with decreasing distance from the metal matrix, wherein the coating amounts of the carbon element C and the metal element Me are adjusted such that a region having a higher concentration of the carbon element than that of the metal element in the coating layer has a thickness of 0.01~5.0 μm and a region having a higher concentration of the metal element than that of the carbon element in the coating layer has a thickness of 0.01~5 0 μm.

8. The method according to claim 7, further comprising: cleaning a surface of the metal matrix before forming the coating layer.

9. The method according to claim 7, further comprising: etching a surface of the metal matrix before forming the coating layer.

10. The method according to claim 9, wherein the etching is performed by dry etching, the dry etching being ion-gun etching performed using argon gas, during which an electric current of 0.15~0.25 A and a voltage of 800~600V are applied to an ion gun.

11. A method of manufacturing a metal separator for fuel cells, comprising: forming a coating layer comprising a metal layer and a carbon layer on a separator-shaped metal matrix, the metal layer being formed by coating a metal element Me on the metal matrix, the carbon layer being formed on the metal layer, wherein the carbon layer has a thickness of 0.01~5.0 μm and the metal layer has a thickness of 0.01~5.0 μm.

* * * * *